US008885492B2

(12) United States Patent
de Silva (10) Patent No.: US 8,885,492 B2
(45) Date of Patent: Nov. 11, 2014

(54) METHODS AND APPARATUS FOR ANALYZING NETWORK TRAFFIC IN A NETWORK INCLUDING A PLURALITY OF NETWORK ANALYZERS

(75) Inventor: Suran Saminda de Silva, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 171 days.

(21) Appl. No.: 13/545,325

(22) Filed: Jul. 10, 2012

(65) Prior Publication Data

US 2014/0016482 A1    Jan. 16, 2014

(51) Int. Cl.
    *H04J 1/16*     (2006.01)
(52) U.S. Cl.
    USPC .......................................... 370/250; 370/338
(58) Field of Classification Search
    USPC ................................................ 370/250, 338
    See application file for complete search history.

(56) References Cited

U.S. PATENT DOCUMENTS

2005/0157664 A1*    7/2005    Baum et al. ................... 370/256
2009/0213859 A1*    8/2009    De Silva et al. ......... 370/395.53

\* cited by examiner

*Primary Examiner* — Sai-Ming Chan
(74) *Attorney, Agent, or Firm* — Meunier Carlin & Curfman, LLC (57) ABSTRACT

Methods and apparatus for analyzing network traffic in a network are disclosed herein. The network may include a plurality of network analyzers. An method for analyzing network traffic may include: receiving a data packet at a first network element including a first header that indicates a destination address of a second network element; generating a new data packet including a copy of at least a portion of the received data packet and a second header that indicates a destination address of a plurality of network elements that are configured to monitor the network traffic; transmitting the received data packet to the second network element; and separately transmitting the new data packet. The new data packet may be replicated by one or more network elements along transmission paths between the first network element and the plurality of network elements that are configured to monitor the network traffic.

20 Claims, 4 Drawing Sheets

METHODS AND APPARATUS FOR ANALYZING NETWORK TRAFFIC IN A NETWORK INCLUDING A PLURALITY OF NETWORK ANALYZERS

BACKGROUND

Network devices, such as network switches, may be configured to provide monitoring capabilities at ingress and/or egress ports. For example, a Switched Port Analyzer (SPAN) may be configured to receive an instance of network traffic, copy the network traffic and forward the copied network traffic to a network analyzer that is configured to collect/analyze network traffic patterns. In addition, a Remote Switched Port Analyzer (RSPAN) may be configured to provide monitored network traffic to a remote network analyzer on a VLAN. Further, an Encapsulated Remote Switched Port Analyzer may be configured to provide monitored network traffic to a remote network analyzer across Layer 2 (L2) boundaries. A user is required to configure the network devices to communicate with the network analyzers, and the number of network analysis sessions (or the number of network analyzers with which the network devices may communicate) are often limited. Thus, a need exists to allow a user to configure a network device to efficiently communicate network analysis traffic to a plurality of network analyzers.

SUMMARY

Methods and apparatus for analyzing network traffic in a network are disclosed herein. The network may include a plurality of network elements connected to the network, and specifically a plurality of network analyzers. An example method for analyzing network traffic may include: receiving a data packet including a first header that indicates a destination address of a second network element at a first network element; generating a new data packet including a copy of at least a portion of the received data packet and a second header that indicates a destination address of a plurality of network elements that are configured to monitor the network traffic; transmitting the received data packet to the second network element; and separately transmitting the new data packet. The new data packet may be replicated by one or more network elements along transmission paths between the first network element and the plurality of network elements that are configured to monitor the network traffic.

In one example implementation, the second header may include a multicast address. Alternatively or additionally, the multicast address may be a Layer 3 (L3) multicast address.

In another example implementation, at least one of the transmission paths may include an L3 tunnel between adjacent network elements.

Optionally, the plurality of network elements that are configured to monitor the network traffic may be members of one or more virtual private networks (VPNs).

In addition, the L3 multicast address may be associated with at least two of the plurality of network elements that are members of a VPN and that are configured to monitor the network traffic.

Additionally, the method may include: storing a VRF forwarding table associated with each VPN; and obtaining a next network hop using an entry in a VRF forwarding table. Separate VRFs can be used to isolate network analysis traffic from other network traffic.

Optionally, the data packet can be received at the first network element on a first VPN, and the new data packet can be transmitted on a second VPN that is different than the first VPN. By transmitting the new data packet on a different VPN, it is possible to separate the network users from the network analyzers, which can provide improved network security.

One of ordinary skill in the art would understand that the above-described subject matter may also be implemented as a computer process, an article of manufacture, such as a computer-readable storage medium or in a network element.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for analyzing network traffic in a network including a plurality of network analyzers, it will become evident to those skilled in the art that the implementations are not limited thereto.

Figure 1:
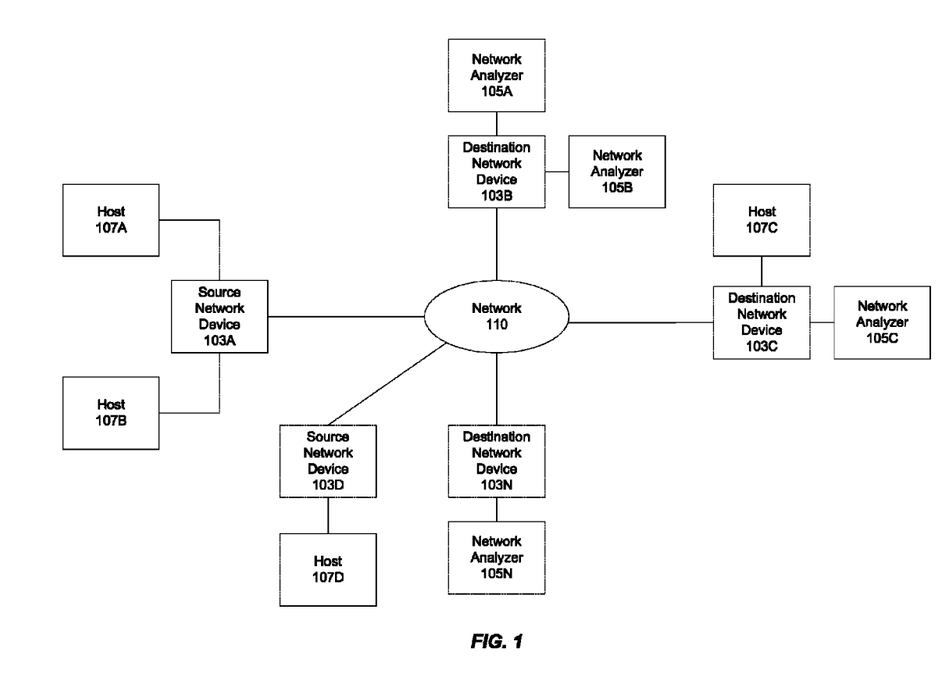
FIG. 1 illustrates an example block diagram of a system for monitoring network traffic including a plurality of network analyzers.

Referring to FIG. 1, an example block diagram of a system for monitoring network traffic is shown. The system may include a network 110, source and destination network devices 103A, 103B, 103C, 103D, 103N, network analyzers 105A, 105B, 105C, 105N and hosts 107A, 107B, 107C, 107D. In one implementation, the source and destination network devices 103A, 103B, 103C, 103D, 103N may be network switches, for example, and the hosts 107A, 107B, 107C, 107D may be personal computers, laptop computers, network devices, or any other type of network-connectable computing devices. The network devices, network analyzers and hosts may be configured as computing devices discussed below with regard to FIG. 5. FIG. 1 is only one example system configuration, and many other configurations are possible that include more or fewer devices than shown in FIG. 1. For example, systems may include any number of routers, switches, hubs, gateways, computing devices, and any other network devices connected to the network 110. Additionally, systems can include a plurality of source network devices and a plurality of destination network devices. As discussed below, the source network devices are capable of generating and transmitting network analysis traffic (i.e., copied data packets) to the same multicast group and/or VPN.

As shown in FIG. 1, the source and destination network devices 103A, 103B, 103C, 103D, 103N are communicatively connected to the network 110. The network 110 may be any type of communication network such as, for example, the Internet. In addition, the hosts 107A, 107B are communicatively connected to the source network device 103A, and are therefore communicatively connected to the network 110 via the source network device 103A. The host 107D is communicatively connected to the source network device 103D, and is therefore communicatively connected to the network 110 via the source network device 103D. The network analyzers 105A, 105B are communicatively connected to the destination network device 103B, and are therefore communicatively connected to the network 110 via the destination network device 103B. Similarly, the host 107C and the network analyzer 105C are communicatively connected to the destination network device 103C, and are therefore communicatively connected to the network 110 via the destination network device 103C. Further, the network analyzer 105N is communicatively connected to the destination network device 103N, and is therefore communicatively connected to the network 110 via the destination network device 103N. The hosts 107A, 107B, 107C, 107D and the network analyzers 105A, 105B, 105C, 105N may be communicatively connected to the source and destination network devices 103A, 103B, 103C, 103D, 103N through one or more ports of the devices via any type of direct connection such as, but not limited to, Ethernet, Wi-Fi, WiMAX, 3G or 4G. Alternatively or additionally, the hosts 107A, 107B, 107C, 107D and the network analyzers 105A, 105B, 105C, 105N may be communicatively connected to the source and destination network devices 103A, 103B, 103C, 103D, 103N indirectly through additional networks, such as local area networks (LANs), wide area networks (WANs) or metropolitan area networks (MANs), for example.

The source and destination network devices 103A, 103B, 103C, 103D, 103N may, for example, be switches configured to receive network traffic (i.e., data packets) from the hosts 107A, 107B, 107C, 107D and the network analyzers 105A, 105B, 105C, 105N, determine destinations for the received data packets and forward the data packets to the respective destination devices. The network analyzers 105A, 105B, 105C, 105N may be configured to receive network analysis traffic, which may include at least portions of the data packets, flowing among the various hosts and network devices discussed above. For example, the network analyzers 105A, 105B, 105C, 105N may be configured to analyze the network analysis traffic and generate statistics and/or other information regarding the network traffic. The network analyzers 105A, 105B, 105C, 105N may, for example, be configured to receive network analysis traffic regarding the network traffic flowing between network nodes, such as the hosts 107A, 107C and 107D, that flows over the network 110. In addition, the network analyzers 105A, 105B, 105C, 105N may be configured to receive network analysis traffic regarding the network traffic flowing between network nodes, such as the hosts 107A and 107B, that does not flow over the network 110. In particular, the network analyzers 105A, 105B, 105C, 105N may be configured to receive network analysis traffic from any of the network devices 103A, 103B, 103C, 103D, 103N.

In an example implementation, the source network device 103A may receive a data packet from the host 107A. As discussed above, the source network device 103A may be a switch configured to receive a data packet, determine the destination for the received data packet and forward the data packet to its destination. The data packet received by the source network device 103A may include a destination address of the destination device within a field of the data packet. For example, if the received data packet is destined for the host 107C, the received data packet may include a destination address for the host 107C, such as a destination IP address of the host 107C. In addition to forwarding the received data packet to the destination device, the source network device 103A may be configured to send network analysis traffic to one or more of the network analyzers 105A, 105B, 105C, 105N. The source network device 103A may be configured to analyze network traffic at one or more ingress and/or egress ports of the source network device 103A. In order to provide network analysis without interrupting the original data flow, the source network device 103A may be configured to generate a new data packet including a copy of at least a portion of the received data packet for transmission to one or more of the network analyzers 105A, 105B, 105C, 105N. The source network device 103A may be configured to provide the new data packet with a destination address for one or more of the network analyzers 105A, 105B, 105C, 105N. Thus, the new data packet generated by the source network device 103A may include data copied from the received data packet, including but not limited to the original packet payload data and original source and destination addresses, original packet VPN, as well as the destination address of one or more of the network analyzers 105A, 105B, 105C, 105N and any other data such as a source port, a timestamp, etc. The source network device 103A may forward the received data packet to the original destination device, as well as separately forward the generated new packet to one or more of the network analyzers 105A, 105B, 105C, 105N. The above operations may, for example, be performed by an ASIC of the source network device 103A in one example implementation.

It is possible to multicast network traffic to more than one network node. For example, a source node may send a message having a multicast address over the network. The multicast address may be shared by a number of destination nodes. For example, when using IP communication, class D IP addresses are reserved for creating multicast groups. While traversing the network between the source node and the destination nodes, the network nodes along the transmission paths replicate the message such that the message is ultimately received by the destination nodes sharing the multicast address. In particular, the message may be replicated at the network nodes where communication paths diverge. There are a number of multicast routing protocols available for constructing multicast spanning trees that create network paths from the source node to the destination nodes. The Protocol Independent Multicast (PIM) is one example routing protocol that efficiently delivers a multicast message to the destination node. However, other multicast routing protocols are known in the art. Thus, it may be possible to multicast network analysis traffic from a source network node (i.e., the source network device 103A, 103D) to a plurality of network analyzers (i.e., the network analyzers 105A, 105B, 105C, 105N). By multicasting the network analysis traffic, the source network device 103A, 103D may only be required to transmit a single copy of the network analysis traffic, which may be replicated along the transmission paths before being received by the network analyzers 105A, 105B, 105C, 105N. Thus, multicasting enables forwarding of network analysis traffic from a source network device (i.e., source network device 103A, 103D, for example) using only one copied data packet in contrast to unicasting, which requires head-end replication of multiple unicast copies of the data packet.

Multicasting network analysis traffic to the network analyzers 105A, 105B, 105C, 105N may reduce network bandwidth because the network analysis traffic is not replicated head-end (i.e., at the source network device 103A, 103D). For example, if it is desirable to send the network analysis traffic to the network analyzers 105A and 105B, which may be physically located in the same data center, it is less efficient to send a separate copy from the source network device 103A, 103D to each of the network analyzers 105A and 105B than to send a single copy from the source network device 103A, 103D to both of the network analyzers 105A and 105B. When separate copies are sent to each of the network analyzers 105A and 105B, the separate copies may travel substantial portions of the same transmission path between the source network device 103A, 103D and the network analyzers 105A and 105B. Thus, it is more efficient to send a single copy from the source network device 103A, 103D, and then replicate the single copy as needed along the transmission path in order to deliver copies to both of the network analyzers 105A and 105B.

In addition to reducing network bandwidth, multi-casting enables the network analyzers 105A, 105B, 105C, 105N to join and/or leave multicast groups without reconfiguring the source and destination network devices 103A, 103B, 103C, 103D, 103N. For example, the network analyzers 105A, 105B, 105C, 105N may dynamically join and/or leave the multicast groups by indicating interest and/or disinterest in the multicast groups. When the source and destination network devices 103A, 103B, 103C, 103D, 103N are configured for multicasting, the source and destination network devices 103A, 103B, 103C, 103D, 103N are aware of the multicast groups. The network analyzers 105A, 105B, 105C, 105N can then join multicast groups to receive network analysis traffic. The multicast groups are configured within VPNs in the network 110. The multicast groups are configured and distributed using multicast protocols. For example, an example protocol for managing multicast groups that the network devices 103A, 103B, 103C, 103D, 103N and the network analyzers 105A, 105B, 105C, 105N may utilize is Internet Group Management Protocol (IGMP).

Each network analyzer 105A, 105B, 105C, 105N may, for example, join one or more multicast groups. The multicast groups may be created to send different types of network analysis traffic from a source network device to different groups of network analyzers. In one example implementation, a multicast group may be created for network analysis traffic copied at specific network locations, such as network traffic received at or transmitted by network access switches, for example. In another example implementation, a multicast group may be created for network analysis traffic related to a specific type of network traffic, such as TCP traffic associated with a specific port number, for example. In yet another example implementation, a multicast group may be created for network analysis traffic related to a specific type of interface on the network devices. In addition, each network analyzer 105A, 105B, 105C, 105N may join one or more multicast groups in order to receive the different types of the network analysis traffic it may be configured to analyze. Multicast groups are not limited to the examples discussed above, and may be created for any type of network analysis traffic.

As discussed above, RSPAN and ERSPAN are known in the art. With regard to RSPAN, the monitored network traffic is mirrored at a source network device and transmitted to a remote network analyzer over a network analysis VLAN. With regard to ERSPAN, because the remote network analyzer is located across an L2 boundary, the monitored network traffic is mirrored at the source network device and encapsulated with a new header (i.e., an L3 tunnel header) before being transmitted to the remote network analyzer. For example, the monitored network traffic may be encapsulated in accordance with Generic Routing Encapsulation (GRE) to include the destination IP address of an L3 network device. By encapsulating the network analysis traffic with an L3 tunnel header, it is possible to create an L3 tunnel between the devices, and the network analysis traffic may be transmitted across L2 boundaries.

Figure 2:
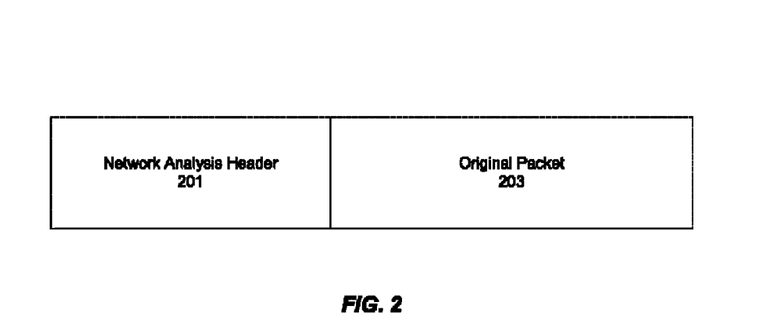
FIG. 2 illustrates an example encapsulated packet.

Thus, in an example implementation, the network analysis traffic may be provided with a header that indicates a destination address of a plurality of network analyzers. An example network analysis packet is illustrated in FIG. 2. For example, the original packet 203 is encapsulated with a network analysis header 201. The original packet 203 may be a copy of at least a portion of the original packet received by a source network device, such as the source network device 103A, 103D, and may also include other data such as the original source and destination addresses, for example. The network analysis header 201 may be a multicast address that designates a multicast group. Additionally, the network analysis header 201 may be an L3 multicast address. The network analysis header 201 can optionally enable the network analysis traffic to be transmitted on a different VPN than the VPN over which the data packet was received by the source network device.

In order to provide additional levels of security, the network analyzers 105A, 105B, 105C, 105N may be organized in one or more virtual private networks (VPNs). When the network analyzers 105A, 105B, 105C, 105N are organized in VPNs, it is possible to separate the network users from the network analyzers 105A, 105B, 105C, 105N. Specifically, the source network device 103A, 103D can receive the data packet on a first VPN, and then, the source network device 103A, 103D can transmit the copied data packet on a second VPN, which is different than the first VPN, for example. In order to join any of the multicast groups, the network analyzers 105A, 105B, 105C, 105N must join a VPN. Membership in the VPN may, for example, be controlled by an authentication mechanism, such as an authorization, authentication and accounting (AAA) server. In addition, virtual routing and forwarding (VRF) may be implemented to isolate the network analysis traffic from other network traffic. In particular, VRF may be used to route the network analysis traffic between a source network device, such as the source network device 103A, 103D, and the network analyzers, such as the network analyzers 105A, 105B, 105C, 105N. VRF allows multiple instances of a routing table to exist in any particular network device, such as the source and destination network devices 103A, 103B, 103C, 103D, 103N, or any other network device, such as routers, switches, gateways, etc., along the transmission paths between the source network device and the network analyzers. In addition, VRF requires a forwarding table that designates the next network hop, a list of network devices that may forward network analysis traffic and rules and protocols governing forwarding of network analysis traffic within the VPN. VRF may keep network analysis traffic within the VPN and unwanted network traffic out of the VPN. VRF is particularly useful when the network analyzers 105A, 105B, 105C, 105N are spread over L2 boundaries.

Separate VRFs can be used to isolate network analysis traffic from other network traffic. For example, the network analyzers 105A, 105B, 105C, 105N can be on an analyzer VRF, and the hosts 107A, 107B, 107C, 107D can be on a user VRF. Additionally, as discussed above, the network analyzers 105A, 105B, 105C, 105N can dynamically join and/or leave the multicast groups to receive the network analysis traffic. Therefore, it is possible to change the set of network analyzers that monitor the network analysis traffic and/or change the type of network analysis traffic each of the network analyzers is monitoring without reconfiguring the source and destination network devices 103A, 103B, 103C, 103D, 103N. For example, if the need arises to introduce a new network analyzer to monitor the network analysis traffic, the new network analyzer can join the analyzer VRF and then dynamically join one or more of the multicast groups in the analyzer VRF to receive the portions of network analysis traffic the new network analyzer is interested in monitoring. The new network analyzer can therefore get a unique view of the network analysis traffic as compared to the other network analyzers by dynamically joining a subset of the multicast groups. This is possible without applying any configuration changes to the source and destination network devices 103A, 103B, 103C, 103D, 103N. Additionally, one or more the network analyzers 105A, 105B, 105C, 105N can leave the multicast groups and later rejoin the multicast groups (i.e., to restart monitoring) without applying any configuration changes to the source and destination network devices 103A, 103B, 103C, 103D, 103N.

Figure 3:
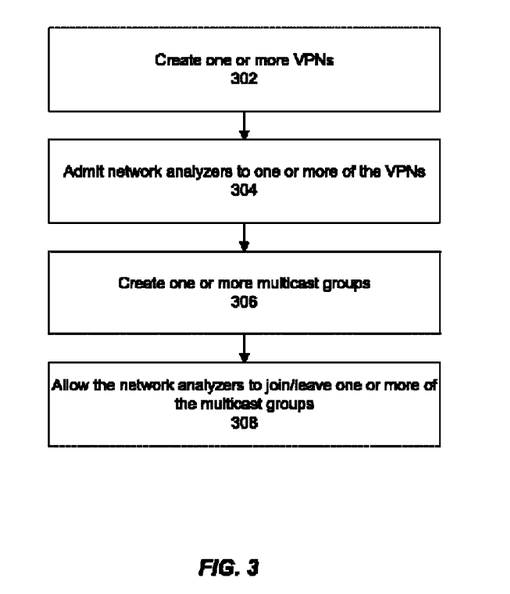
FIG. 3 illustrates an example routine for managing a plurality of network analyzers.

Referring to FIG. 3, an example routine for managing a plurality of network analyzers is shown. At 302, one or more VPNs may be created. The VPNs may be created in order to provide additional security to protect the network analysis traffic. For example, it may be desirable to keep the network analysis traffic within a VPN and keep unwanted traffic outside of the VPN because the user may not want the network analysis traffic to be received by any network device. In addition, VRF may be implemented to control the network analysis traffic flowing within the VPNs. A VRF forwarding table may be created for each of the VPNs, and each VRF forwarding table may designate the next network hop, a list of network devices that may forward the network analysis traffic and rules and protocols governing forwarding of the network analysis traffic within the VPN. Thus, the network devices along the transmission paths between the source network device and the network analyzers may choose VRF forwarding tables corresponding to the one or more VPNs of which the network analyzers in the multicast groups are members to determine the next network hop. By utilizing VRF, it may be possible to isolate the network analysis traffic from other types of network traffic. At 304, the network analyzers may be admitted to one or more of the VPNs. As discussed above, an AAA server may act as an authenticating mechanism for admitting the network analyzers to the VPNs. Thus, by controlling admission to the VPNs, it may be possible to prevent unwanted network devices from accessing the network analysis traffic.

At 306, one or more multicast groups may be created. Each multicast group may be associated with a different multicast address. As discussed above, when using IP communication, class D IP addresses are reserved for creating multicast groups. In addition, multicast groups may be created for any type of network analysis traffic. At 308, after being admitted to one or more of the VPNs, network analyzers may dynamically join and/or leave one or more of the multicast groups. For example, using IGMP or any other multicast group management protocol, the network analyzers 105A, 105B, 105C, 105N may join one or more multicast groups to receive network analysis traffic. By using a multicast join, the network analyzers 105A, 105B, 105C, 105N may join and/or leave the multicast groups without reconfiguring the source and destination network devices 103A, 103B, 103C, 103D, 103N.

Figure 4:
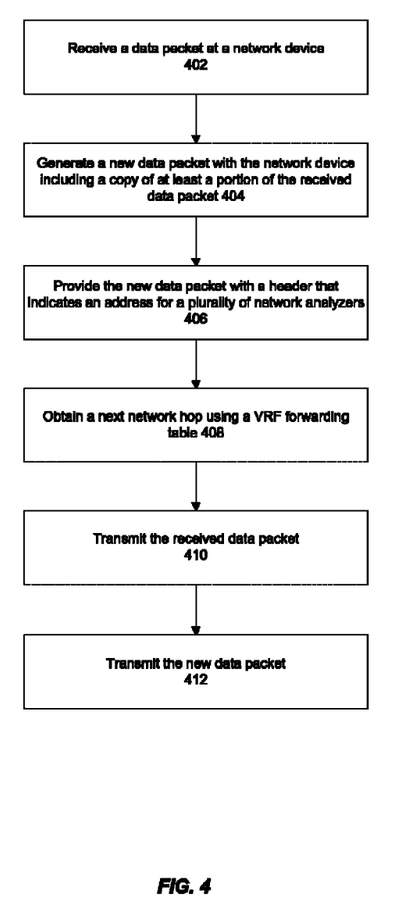
FIG. 4 illustrates an example routine for analyzing network traffic within the system of FIG. 1.

Referring to FIG. 4, an example routine for analyzing network traffic is shown. At 402, a data packet may be received at a network device. As discussed above, the data packet may be received at the source network device 103A, 103D. The data packet may indicate a destination address, such as a destination IP address for example, of a destination network device. In order to avoid interrupting the original data flow, the network device may generate a new data packet including a copy of at least a portion of the received data packet at 404. In addition, at 406, the network device may provide the new data packet with a header that indicates an address for a plurality of network analyzers. As discussed above, the header may be a multicast address. At 408, the network device may obtain a next network hop using a VRF forwarding table. By implementing VRF, it may be possible to control flow of the network analysis traffic through the VPNs. At 410, the network device may transmit the received data packet to the original destination device, and at 412, the network device may transmit the new data packet to the plurality of network analyzers.

Figure 5:
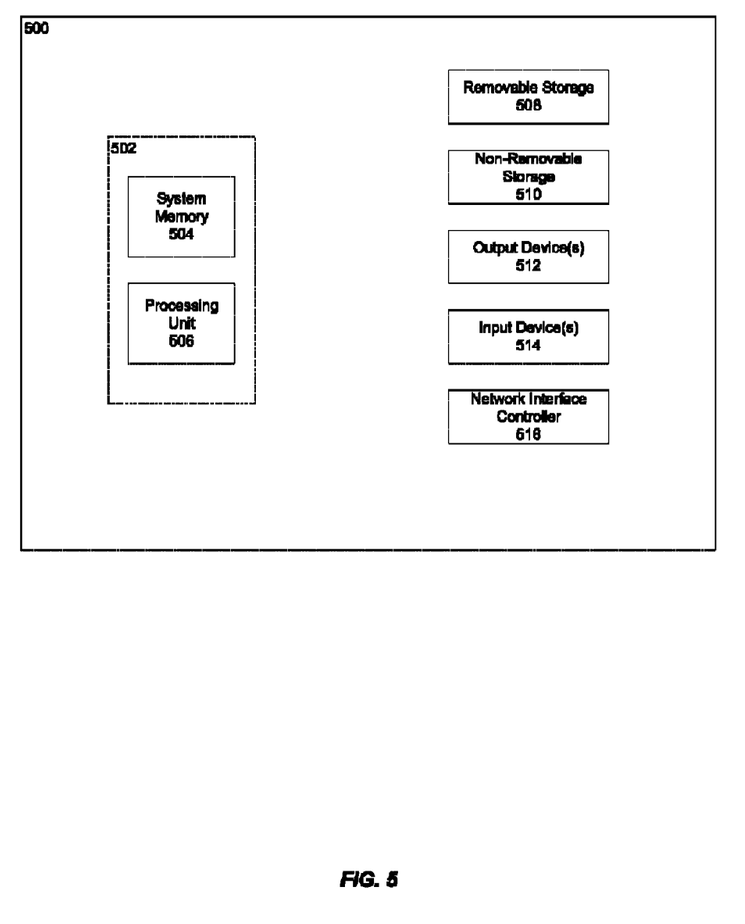
FIG. 5 illustrates an example computing device.

Referring to FIG. 5, an example computing device is illustrated. The source and destination network devices, network analyzers and hosts discussed above may be configured as computing devices, such as computing device 500 shown in FIG. 5. In its most basic configuration, computing device 500 typically includes at least one processing unit 506 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 502. The processing unit may be a standard programmable processor that performs arithmetic and logic operations necessary for operation of the computing device 500.

The processing unit 506 may be configured to execute program code encoded in tangible, computer-readable media. For example, the processing unit 506 may execute program code stored in the system memory 504.

Computing device 500 may have additional features/functionality. For example, computing device 500 may include additional storage such as removable storage 508 and non-removable storage 510 including, but not limited to, magnetic or optical disks or tapes. Computing device 500 may also contain a network interface controller 516 that allow the device to communicate with other devices. In some implementations, the network interface controller 516 may include its own processor and memory. The processor of the network interface controller may be a standard programmable processor or a processor configured to implement a specific function. Computing device 500 may also have input device(s) 514 such as a keyboard, mouse, touch screen, etc. Output device(s) 514 such as a display, speakers, printer, etc. may also be included. All these devices are well known in the art and need not be discussed at length here.

Computing device 500 typically includes a variety of computer readable media. Computer readable media can be any available media that can be accessed by device 500 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for analyzing network traffic in a network, the method comprising:
   receiving a data packet at a first network element including a first header that indicates a destination address of a second network element;
   generating a new data packet including a copy of at least a portion of the received data packet and a second header that indicates a destination address of a plurality of network elements that are configured to monitor the network traffic;
   transmitting the received data packet to the second network element; and
   separately transmitting the new data packet, wherein the new data packet is replicated by one or more network elements along transmission paths between the first network element and the plurality of network elements that are configured to monitor network traffic.

2. The method of claim 1, wherein the second header comprises a multicast address.

3. The method of claim 2, wherein the multicast address is a Layer 3 (L3) multicast address.

4. The method of claim 3, wherein the plurality of network elements that are configured to monitor the network traffic are members of one or more virtual private networks (VPNs).

5. The method of claim 4, wherein the L3 multicast address is associated with at least two of the plurality of network elements that are configured to monitor the network traffic.

6. The method of claim 5, further comprising:
   storing a virtual routing and forwarding (VRF) forwarding table associated with each VPN; and
   obtaining a next network hop using an entry in a VRF forwarding table; and
   separately transmitting the new data packet further comprises transmitting the new data packet to the next network hop.

7. The method of claim 1, wherein the data packet is received at the first network element on a first VPN, and the new data packet is transmitted on a second VPN that is different than the first VPN.

8. A non-transitory computer-readable recording medium having computer-executable instructions stored thereon that, when executed by a first network element, cause the first network element to:
   receive a data packet including a first header that indicates a destination address of a second network element;
   generate a new data packet including a copy of at least a portion of the received data packet and a second header that indicates a destination address of a plurality of network elements that are configured to monitor network traffic;
   transmit the received data packet to the second network element; and
   separately transmit the new data packet, wherein the new data packet is replicated by one or more network elements along transmission paths between the first network element and the plurality of network elements that are configured to monitor the network traffic.

9. The non-transitory computer-readable recording medium of claim 8, wherein the second header comprises a multicast address.

10. The non-transitory computer-readable recording medium of claim 9, wherein the multicast address is a Layer 3 (L3) multicast address.

11. The non-transitory computer-readable recording medium of claim 10, wherein the plurality of network elements that are configured to monitor the network traffic are members of one or more virtual private networks (VPNs).

12. The non-transitory computer-readable medium of claim 11, wherein the L3 multicast address is associated with at least two of the plurality of network elements that are configured to monitor the network traffic.

13. The non-transitory computer-readable medium of claim 12, the non-transitory computer-readable medium having further computer-executable instructions stored thereon that, when executed by the first network element, cause the first network element to:
   store a virtual routing and forwarding (VRF) forwarding table associated with each VPN;
   obtain a next network hop using an entry in a VRF forwarding table; and
   separately transmit the new data packet by transmitting the new data packet to the next network hop.

14. The non-transitory computer-readable medium of claim 8, wherein the Data packet is received at the first network element on a first VPN, and the new data packet is transmitted on a second VPN that is different than the first VPN.

15. A network element, comprising:
   a processor; and
   a memory communicatively connected with the processor for storing computer-executable instructions thereon that, when executed by the processor, cause the processor to:
   receive a data packet including a first header that indicates a destination address of a destination network element;

generate a new data packet including a copy of at least a portion of the received data packet and a second header that indicates a destination address of a plurality of network elements that are configured to monitor network traffic;

transmit the received data packet to the destination network element; and separately transmit the new data packet, wherein the new data packet is replicated by one or more network elements along transmission paths between the network element and the plurality of network elements that are configured to monitor the network traffic.

16. The network element of claim 15, wherein the second header comprises a Layer 3 (L3) multicast address.

17. The network element of claim 16, wherein the plurality of network elements that are configured to monitor the network traffic are members of one or more virtual private networks (VPNs).

18. The network element of claim 17, wherein the L3 multicast address is associated with at least two of the plurality of network elements that are configured to monitor the network traffic that are members of the one or more VPNs.

19. The network element of claim 18, the memory having further computer-executable instructions stored thereon that, when executed by the processor, cause the processor to:

store a virtual routing and forwarding (VRF) table associated with each VPN; and obtain a next network hop using an entry in a VRF forwarding table; and separately transmit the new data packet by transmitting the new data packet to the next network hop.

20. The network element of claim 15, wherein the data packet is received at the network element on a first VPN, and the new data packet is transmitted on a second VPN that is different than the first VPN.

* * * * *